(12) United States Patent
Abi-Abdallah

(10) Patent No.: US 6,273,573 B1
(45) Date of Patent: Aug. 14, 2001

(54) DISPLAY WINDOW

(75) Inventor: Najib Abi-Abdallah, Coppell, TX (US)

(73) Assignee: Nokia Mobile Phone Limited, Espoo (FI)

( * ) Notice: Subject to any disclaimer, the term of this patent is extended or adjusted under 35 U.S.C. 154(b) by 0 days.

(21) Appl. No.: 09/469,292

(22) Filed: Dec. 22, 1999

(30) Foreign Application Priority Data

Dec. 22, 1998 (GB) .................................................. 9828376

(51) Int. Cl.7 .................................................. G02B 27/00
(52) U.S. Cl. ........................ 359/609; 359/608; 359/601; 359/602; 359/603; 359/900; 156/77
(58) Field of Search .................................. 359/609, 608, 359/601, 602, 603, 604–607, 900; 156/77

(56) References Cited

U.S. PATENT DOCUMENTS

| | | | |
|---|---|---|---|
| 5,224,049 | * 6/1993 | Mushabac | 364/474.05 |
| 5,354,397 | * 10/1994 | Miyake et al. | 156/77 |
| 5,728,328 | 3/1998 | Senda et al. | |

FOREIGN PATENT DOCUMENTS

| | | |
|---|---|---|
| 2548380 | 5/1977 | (DE) . |
| 3345014 | 6/1985 | (DE) . |
| 3421521 | 12/1985 | (DE) . |
| 29613292 | 10/1996 | (DE) . |
| 156246 | 10/1985 | (EP) . |
| 0219700 | 4/1987 | (EP) . |
| 0456822 | 11/1991 | (EP) . |
| 0685247 | 12/1995 | (EP) . |
| 58-003842 | 1/1983 | (JP) . |
| 727920 | 1/1995 | (JP) . |
| 7290652 | 11/1995 | (JP) . |
| 9251188 | 9/1997 | (JP) . |
| 10206603 | 8/1998 | (JP) . |
| 10300902 | 11/1998 | (JP) . |

* cited by examiner

Primary Examiner—Mohammad Sikder
(74) Attorney, Agent, or Firm—Antonelli, Terry, Stotu & Kraus, LLP

(57) ABSTRACT

A method for producing a display window for a communication device covering a display element. The method includes the steps of providing a moulding tool with a matt surface structure, injecting fluid plastics, and cooling of the injected plastics and releasing the display window.

7 Claims, 3 Drawing Sheets

DISPLAY WINDOW

BACKGROUND OF THE INVENTION

The present invention generally relates to the production of display windows. It particularly relates to a method for producing display windows, the moulding tool used in the method and the method of producing the moulding tool.

Communication devices like mobile phones are usually equipped with a display unit, preferably a Liquid Crystal (LCD)-display in combination with a display window. The display window protects the LCD display against damage. Sometimes the display window serves as a lens for slightly magnifying the information presented on the display.

Mobile phones are also used in cars and other vehicles. Typically, the display unit with display window are part of a handset which also has a keyboard, an earpiece and a microphone. The handset is connected to a box, containing other electronics of a mobile phone, that can be placed at any convenient place in the vehicle.

Display windows of communication devices are usually produced by an ejection moulding process. For a good visibility of information presented on the display the surface of the display window is shiny and smooth.

It is generally desirably to make phones as easy to use as possible. However, light reflections on the display window of a mobile phone may be distracting or annoying. For example, a user may have to change the position and/or orientation of the phone relative to light sources or their position relative to the phone, to minimise reflections. For phones used outside buildings, like in vehicles, the reflections of the sunlight can considerably restrict the use of the phone. Furthermore fingerprints on the surface of the display window can deteriorate the visibility of the information on the display.

SUMMARY OF THE INVENTION

According to the invention a method for producing a display window for a communication device covering a display element is disclosed. The method comprises the steps of providing a moulding tool with a matt surface structure, injecting fluid plastics, cooling off the injected plastics and releasing the ready display window from the moulding tool.

With a matt surface of the display window light reflections on the display unit are drastically reduced and fingerprints are not problematic anymore. Furthermore, surprisingly, the visibility of information presented on a display is satisfactory if the outer surface of a display window covering a display element is matt.

Previously, to maximise visibility of the display, the surface roughness of display windows for communication devices was minimised and effectively negligible. The surface was shiny and smooth and therefore caused light reflections.

In technical terms matt may be defined as the surface roughness of the display window. The surface roughness is the collective variation in the height of a surface. Methods for effectively measuring surface roughness are known.

One advantage of the disclosed inventive method is that the display window and the outer surface of the display window are produced in one production step. The matt surface structure is part of the surface of the moulding tool and is copied to the display window during the moulding process. This is more advantageous than applying the matt surface in a second process step to a previously formed display window with a shiny and gloss surface.

Before the display window is released from the moulding tool it has to be cooled off until the plastics has become hard enough that it can be released from the tool without any deformation.

Experiment has shown that the surface roughness of the display unit should be around 1 $\mu$m or finer to obtain a good visibility of the information on the display. If the display window is very near to the display or the information presented on the display is very large the surface roughness could be higher then 1 $\mu$m but for a communication device with the usual dimensions a surface roughness of 1 $\mu$m or finer is optimal. It has to be noted that the surface roughness should not be so fine that light reflections again disturb the visibility of the information presented on the display element.

The display window is advantageously made of clear, hard and transparent plastic material to obtain best visibility. For this purpose the display window is for example made of acrylic.

The invention furthermore relates to a communication device comprising a display element and a separate display window covering the display element wherein at least a portion of the outer surface of the display window is matt.

The display element is for example a LCD display which presents information to the user and the transparent display window covers the LCD display and protects it against damage and dust. The display element can be fixed on a circuit board within the communication device and the display window is an integral part of the front cover of the communication device.

The display window may contain a view area covering the display element and another area, e.g. used for decoration purposes, with only the view area being matt. The view area of the display window is the area of the display window the user is looking through to see the information presented on the display element. Therefore the physical dimensions of the view area (length*width) are similar to the physical dimensions of the LCD display. The other area, which is situated for example around the view area or above or below the view area can be for example shiny or varnished as this does not affect the visibility of the presented information.

The display window is generally unitary, i.e. that the basic structure of the display window incorporating the view area and the matt outer surface is one part.

The invention furthermore relates to a moulding tool for producing a display window covering a display element. The moulding tool has a first part having a recess configured to define a front face of the display window wherein at least a portion of the first part of the moulding tool has a matt surface structure. The moulding tool also has a second part for defining the back part of the display window. The moulding tool has means for releasably bringing the first and second parts into co-operation and the first and second parts co-operate to define the shape and surface of the display window.

According to another aspect of the invention there is provided a method for manufacturing a moulding tool which is used for producing a display window with an outer surface and an inner surface by an injection moulding process. In a first step a recess is configured and dimensioned in the first part of the moulding tool to define a front face of the display window. In a second step electro-eroding is used to provide a matt surface structure on at least a portion of the first part of the moulding tool.

Electro-eroding is a well-known and cheap method to hollow out steel for moulding tools. Electro-eroding can be used to form the recess in the moulding tool and to give a finish to the surface of the moulding tool, i.e. applying a matt structure to the surface of the moulding tool, that will be copied to the front face of the display window during injection moulding.

BRIEF DESCRIPTION OF THE DRAWINGS

For a better understanding of the present invention and to understand how the same may be brought into effect, reference will now be made, by way of example only, to the accompanying drawings, in which.

DETAILED DESCRIPTION

Figure 1:
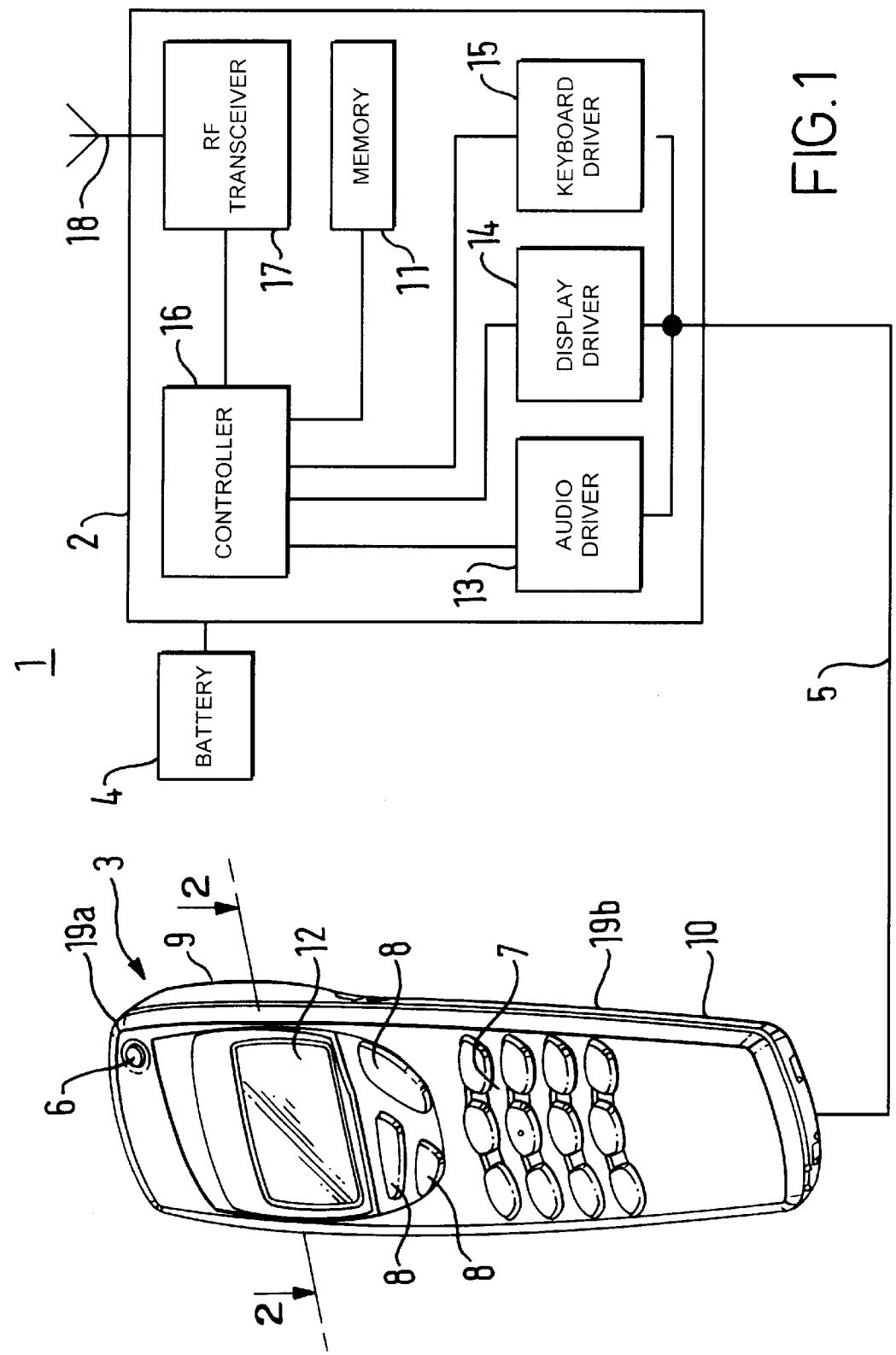
FIG. 1 illustrates a handset with a display unit and phone electronics according to the invention

FIG. 1 shows a communication device like a car phone 1 with the phone electronics 2 placed in any convenient space in the car. The phone electronics 2 are coupled to a handset 3, an antenna 18 and a battery 4.

The antenna 18 is preferably placed outside the car and the battery 4 could be the car battery which the car phone is connected to. The electronics of the phone include a controller 16, a radio frequency receiver and transmitter (RF transceiver) 17, a memory unit 11, an audio driver 13, a display driver 14 and a keyboard driver 15. The drivers 13 to 15 are the interfaces to the handset 3 which is connected physically by wire 5 to the phone electronics 2.

The handset 3 comprises a user interface having an on/off button 6, a keyboard 7, control keys 8, a loudspeaker 9 and a microphone 10 at the backside of the handset 2 and a display unit 12.The housing of the handset 3 consists of the front cover 19a and the back cover 19b.

If for example the user enters a phone number by using keyboard 7 the phone number appears on the display unit 12 and the user can establish a call to the displayed number by pressing one of the control keys 8. Another possibility to dial a phone number could be to select the phone list which is stored in the phones memory 11 with the control keys 8 and select one of the listed phone numbers for dialling when the phone number to be selected is displayed on display unit 12.

Figure 2:
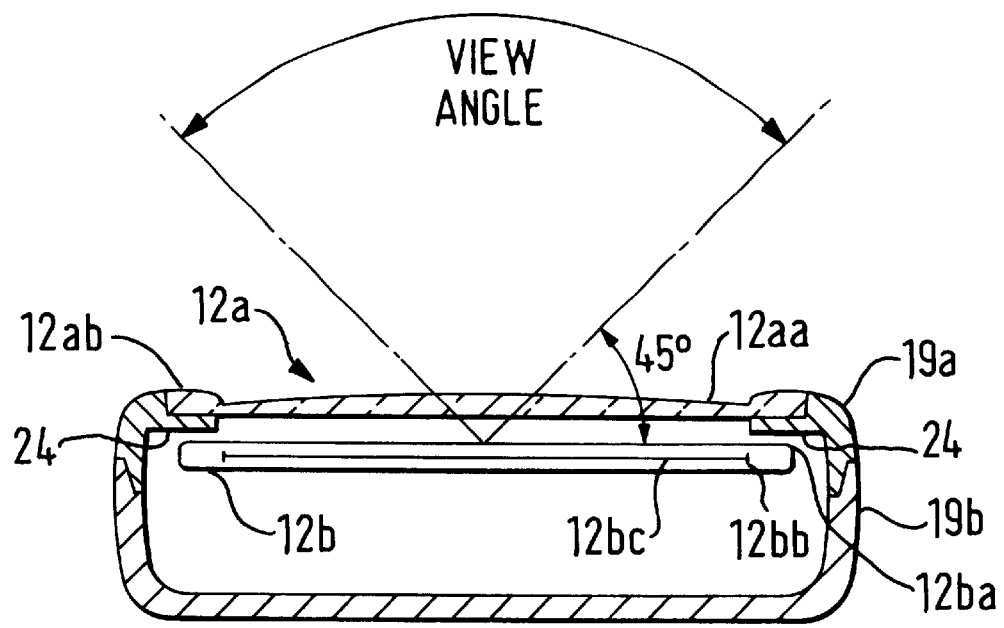
FIG. 2 shows a display window according to the invention

FIG. 2 shows a section view A—A of the handset with the front cover 19a and the back cover 19b in the area of the display unit 12. The display unit 12 consists of a display window 12a and a display element 12b. The display element 12b is a LCD display but could be any other kind of electronic or mechanical display device. The display window 12a has an exterior portion forming part of the exterior of the phone and an interior portion facing the display element. The exterior portion is divided into sections 12aa and 12ab. The section 12aa is the view area of the display window covering mainly the LCD display 12b. The view area 12aa of the display window 12a is matt according to the invention.

The display window 12a is supported by the display holding elements 24 at the parts of the display window section 12ab. The display holding elements 24 are part of the handset front cover 19a. Below and separated from the display window 12a the LCD display 12b is supported.

In the preferred embodiment of the invention display 12b is a Liquid Crystal Display with a height of the visible zone of 23 mm and a width of the visible zone of 37 mm. Display 12b has 4032 pixels on a matrix of 84×48 Pixels. Each pixel is 0.436 mm high and 0.367 mm wide. Between the pixels there is a gap of 0.03 mm. The display 12b consists of two glass tops 12ba and 12bb, each of them with a thickness of around 1 mm. The active LCD area 12bc is located between the two glass tops 12ba and 12bb. The air gap between the upper surface of the display 12b and the lower surface of the display window 12a is about 1.9 mm in the preferred embodiment. As it can be seen the display window section 12aa with the matt outer surface is thinner (around 0.7 mm) at its borders and thicker in the middle of the area (around 1.9 mm). As a result the distance between the upper surface of the display window with the matt view area 12aa and the active LCD area 12bc is between 3.6 mm and 4.8 mm. It would be possible to construct the display unit of the phone in a way that the gap between the display element and the display window is smaller then 1 mm, maybe below to 0.5 mm. This way a dispersing effect of the display window for the information presented on the display is lower and the visibility would be even better.

Figure 3:
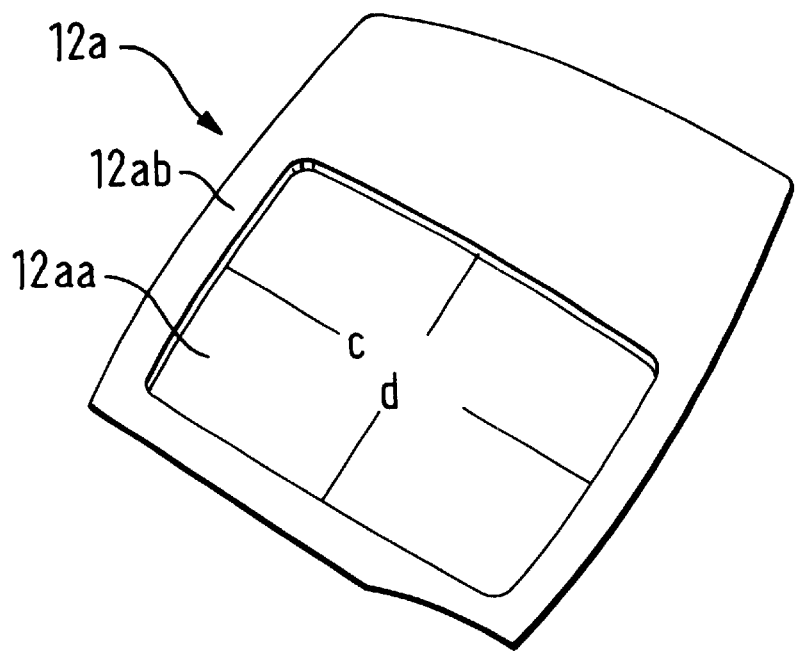
FIG. 3 shows the cross sectional view (A—A) of the handset of FIG. 1
Figure 4:
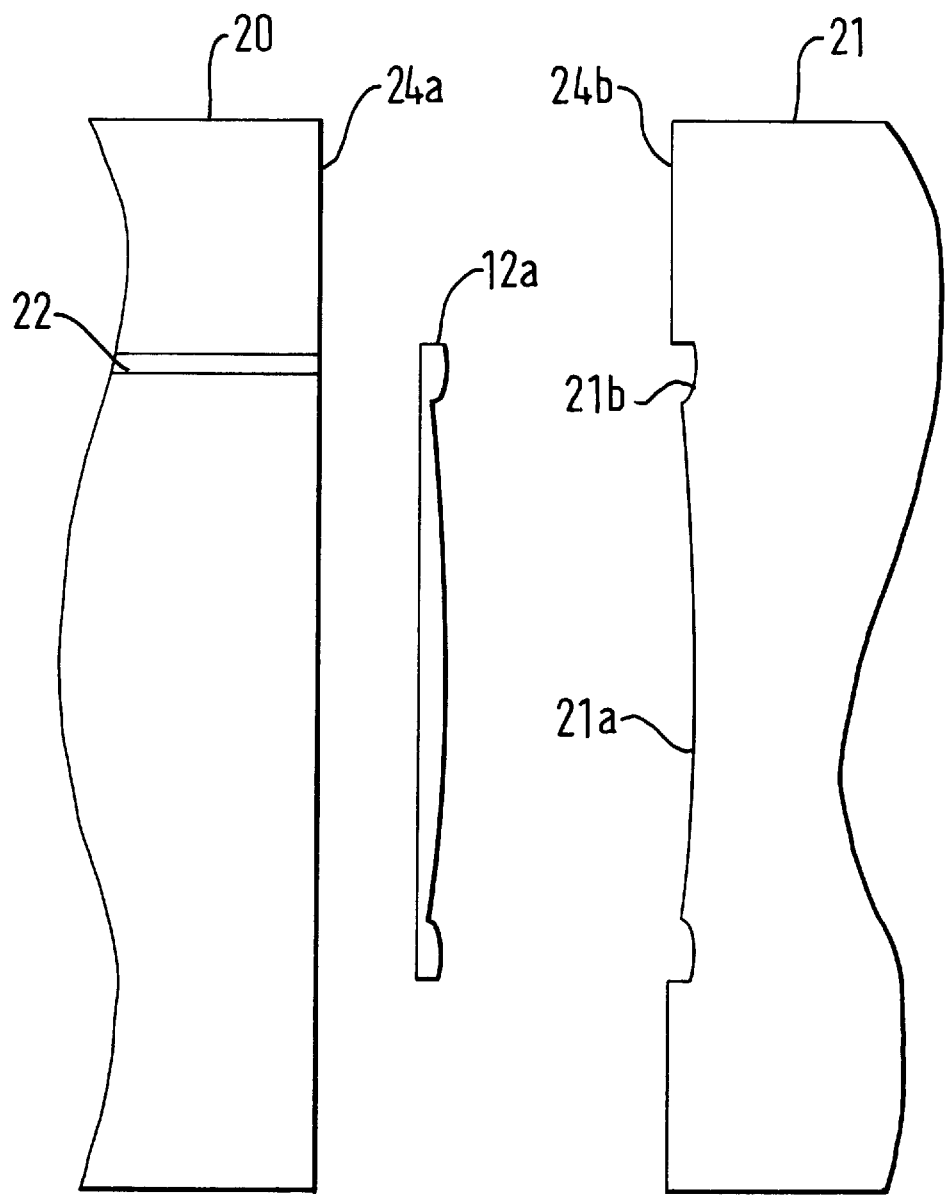
FIG. 4 schematically illustrates a moulding tool according to the invention

The view area 12aa of the display window 12a, as shown in the FIGS. 2–4, has got a section view similar to an optical lens. Therefore the view area 12aa is slightly magnifying the information presented on the display element 12b. This section of the display window is therefore also often called display lens.

For the sake of clarity other parts inside the phone like a printed circuit board the display element 12b is fixed on, e.g. with a sheet of metal, are not shown in the section view of FIG. 2.

The matt surface of view area 12aa of the display window 12a has a surface roughness of 1 μm in the preferred embodiment of the invention. Together with the display parameters and display window parameters mentioned above a good visibility of information presented on the LCD display 12b for the user is achieved within a view angle of 90 degrees as shown in FIG. 2. As the view angle is also limited by the LCD display technology itself and by the refraction of the display window 12a, even if the outer surface of the display window section 12aa is not matt, the view angle is not further limited by the matt surface of display window section 12aa.

FIG. 3 shows a three-dimensional figure of the display window 12a made of transparent acrylic material according to the invention with the view area 12aa (hatched) and the area 12ab (not hatched). The view area 12aa in the preferred embodiment of the invention is about 25 mm high (d) and 37 mm wide (c). The surface of the display window section 12ab can be used as a design element for the handset 3 and may be also matt, transparent or varnished.

FIG. 4 shows a moulding tool with the moulding blocks 20 for forming the backside of display window 12a and moulding block 21 for forming the front side of the display window 12a. Moulding block 21 has a recess having a shape corresponding to the negative form for moulding the display window 12a. The display window 12a is shown for the sake of clarity between the moulding blocks 20 and 21.

The recess defining the negative form for the display window within moulding block 21 is hollowed out from the moulding block 21 by an electro-eroding machine in the preferred embodiment of the invention. The same eroding machine is used to apply the matt surface in the area 21a to recess defining the negative form within the moulding block 21. As mentioned above the settings of the eroding machine should be adjusted such that the surface 21a of the negative form has a roughness of around 1 μm or finer. The electro-eroding machine which can be used for hollowing out the steel of the moulding tool could be for instance of the type "Ingersol Granty 600" or any other electro-eroding machine.

Before the moulding process starts the moulding blocks 20 and 21, and this way the plains 24a and 24b are pressed together with high pressure. Between the tools 21 and 20 the moulding cavity for the display window 12a is formed by the recess in the tool 21 and the plane 24a of tool 20. The hot and therefore fluid acrylic material is pressed with high pressure through channel 22 into the cavity. This way the backside of the display window 12b is formed by plain 24a and the front side is formed by the cavity within moulding block 21. The matt surface 21a, which was applied to the moulding block 21 by electro-eroding, is copied to the front side of display window 12a.

After the acrylic material has cooled off between the moulding blocks 20 and 21 the blocks are separated from each other. A mechanism which is not shown for the sake of clarity, ejects the one-piece or unitary display window 12b from the moulding blocks after they are separated from each other. The display window 12b is preferably ejected after it has cooled off enough and is hard enough that it can be ejected without deforming it.

Even other machines using other technologies for cutting the steel and adding the necessary surface to the moulding block could be used. As an example it would be possible to hollow out the steel with an electro-eroding machine as described before and apply the surface 21a to the moulding tool 21 by an etching process. Acid is a preferred etchant.

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of invention.

What is claimed is:

1. A method for producing a display window for a communication device covering a display element, comprising the steps of:
   providing a moulding tool with a matt surface structure to form a display window with a matt surface,
   injecting plastics in fluid form into the moulding tool,
   cooling off the injected plastics thereby forming the display window, and releasing the display window from the moulding tool.

2. A method for producing a display window as claimed in claim 1 wherein the matt surface structure is applied to the moulding tool by electro-eroding.

3. A method for producing a display window as claimed in claim 1, wherein the matt surface of the moulding tool is structured with a surface roughness of 1 μm or finer.

4. A method for producing a display window as claimed in claim 1, wherein the plastics is acrylic.

5. A method for producing a display window as claimed in claim 1, wherein the moulding tool has a first and a second part, the first part having a recess configured and dimensioned to define a front face of the display window.

6. A method for producing a display window as claimed in claim 5, wherein at least a portion of the first part of the moulding tool has a matt surface structure.

7. A method for producing a display window as claimed in claim 5, wherein the moulding tool has a second part configured and dimensioned to define the back part of the display window, the first part and the second part of the moulding too co-operating to define the shape of the display window.

* * * * *